United States Patent
Seki

(10) Patent No.: US 9,164,582 B2
(45) Date of Patent: Oct. 20, 2015

(54) DISPLAY CONTROL DEVICE AND METHOD DETECTING EYE POSITION OF A USER

(75) Inventor: Hirokazu Seki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 112 days.

(21) Appl. No.: 13/982,189

(22) PCT Filed: Feb. 3, 2012

(86) PCT No.: PCT/JP2012/000738
§ 371 (c)(1),
(2), (4) Date: Jul. 26, 2013

(87) PCT Pub. No.: WO2012/111272
PCT Pub. Date: Aug. 23, 2012

(65) Prior Publication Data
US 2013/0300654 A1 Nov. 14, 2013

(30) Foreign Application Priority Data

Feb. 14, 2011 (JP) .................................. 2011-028203

(51) Int. Cl.
*G06F 3/01* (2006.01)
*H04N 21/4725* (2011.01)
(Continued)

(52) U.S. Cl.
CPC .............. *G06F 3/013* (2013.01); *G06F 3/0485* (2013.01); *G09G 5/34* (2013.01); *H04N 21/4725* (2013.01);
(Continued)

(58) Field of Classification Search
CPC ........... G06F 3/01–3/013; G06F 3/048; G06F 3/0481; G06F 3/0482; G06F 3/0484; G06F 3/04842; G06F 3/04847; G06F 3/0485; G06F 3/04855; G06F 2203/04801; G06F 2203/04803; G09G 5/08; G09G 5/34–5/346; G06K 9/00335–9/00355
USPC ........................... 345/156, 157; 715/856–863
See application file for complete search history.

(56) References Cited

U.S. PATENT DOCUMENTS 5,850,211 A * 12/1998 Tognazzini .................... 345/158
2006/0048189 A1* 3/2006 Park et al. ....................... 725/46
(Continued)

FOREIGN PATENT DOCUMENTS

JP 02-173696 7/1990
JP 10-124035 5/1998
(Continued)

OTHER PUBLICATIONS
English translation of JP 2000-020196.*

*Primary Examiner* — Nathan Danielsen
(74) *Attorney, Agent, or Firm* — Hamre, Schumann, Mueller & Larson, P.C.

(57) ABSTRACT

A display control device 1 is provided, which suppresses a display content from being scrolled when a viewer does not consciously pay attention to the display content. The display control device 1 includes: a display unit 16; an image pickup unit 11 that detects an eye position of a viewer from a taken image of the viewer; an attention state determination unit 12 that determines an attention state to the display content, based on movement of the detected viewer's eye position; a gaze position specifying unit 14 that specifies a gaze position on the display content, based on the detected viewer's eye position and the display content; and a display control unit 15 that causes the display unit 16 to display a non-displayed portion of displayed program information, based on the determined attention state and the specified gaze position, when the viewer pays attention to the non-displayed portion.

10 Claims, 21 Drawing Sheets

(51) Int. Cl.
*H04N 21/482* (2011.01)
*G06F 3/0485* (2013.01)
*G09G 5/34* (2006.01)
*G06K 9/00* (2006.01)
*H04N 21/422* (2011.01)
*H04N 21/4415* (2011.01)
*H04N 21/485* (2011.01)
*G09G 5/08* (2006.01)

(52) U.S. Cl.
CPC ........ *H04N 21/4821* (2013.01); *G06K 9/00335* (2013.01); *G09G 5/08* (2013.01); *H04N 21/42201* (2013.01); *H04N 21/4415* (2013.01); *H04N 21/4854* (2013.01)

(56) References Cited

U.S. PATENT DOCUMENTS

| | | | |
|---|---|---|---|
| 2008/0143674 A1* | 6/2008 | Molander et al. | 345/157 |
| 2011/0141010 A1* | 6/2011 | Sakata et al. | 345/156 |
| 2013/0050432 A1* | 2/2013 | Perez et al. | 348/47 |

FOREIGN PATENT DOCUMENTS

| | | |
|---|---|---|
| JP | 11-085452 | 3/1999 |
| JP | 2000-020196 | 1/2000 |
| JP | 2007-121489 | 5/2007 |
| JP | 2007-271848 | 10/2007 |
| WO | WO 2010143377 A1 * | 12/2010 |

* cited by examiner

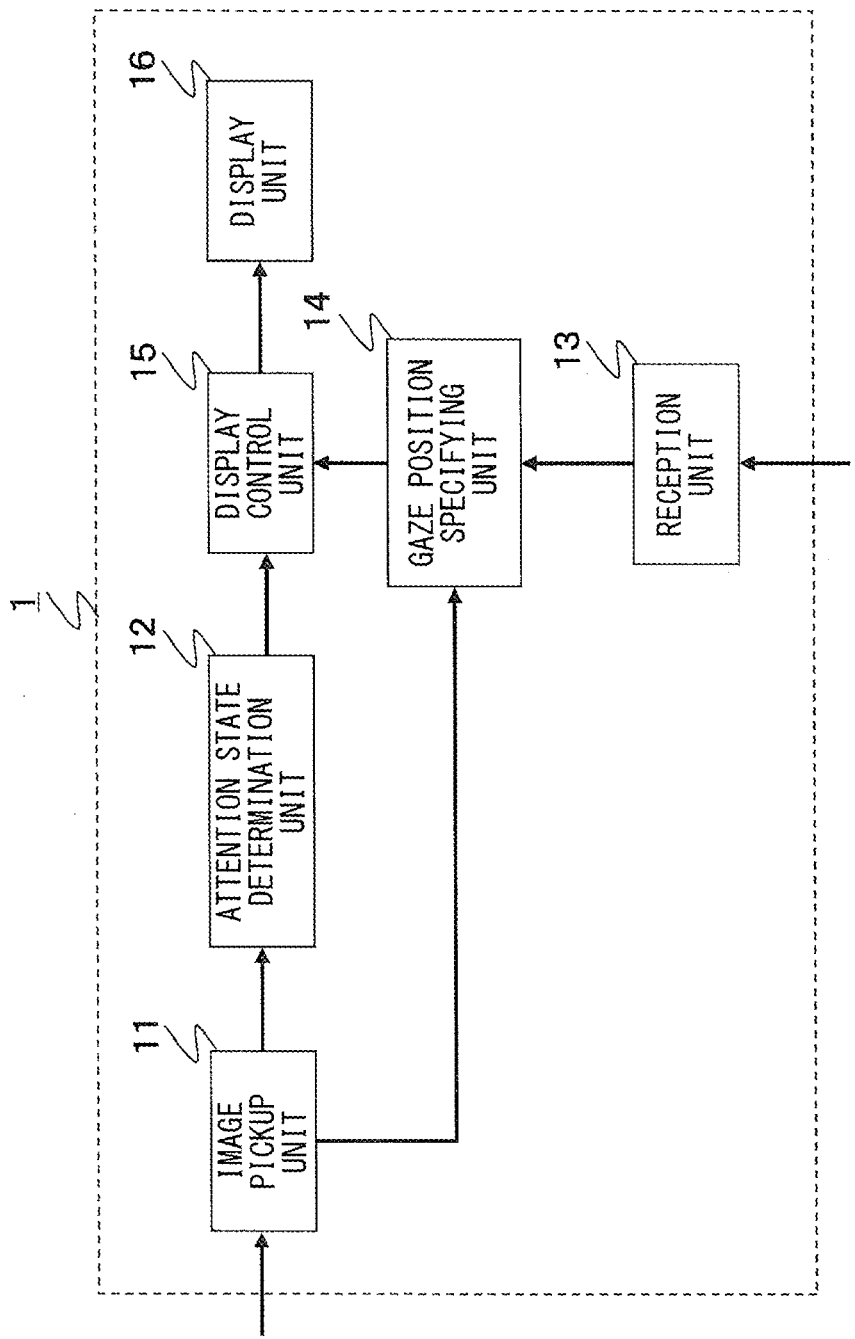

F I G. 2

| Sept. 1 (Fri)<br>14:00 – 15:00 | Blessings of Nature<br>Specialists debate about global warming. What are the tips ... |
| --- | --- |

| | 061 | 081 | 101 |
| --- | --- | --- | --- |
| 14 | 00 Kansai News<br>Latest news and local weather forecast. Today's sports special. | 00 Blessings of Nature<br>Specialists debate about global warming. What are ... | 00 Political and Economic News |
| 15 | | 00 Amusing Variety Show<br>Popular comedians and entertainers play quiz battles. Who will ... | 00 Documentary |
| 16 | 00 Cooking Class | 00 Documentary Western Japan | 00 Detective Quiz |

F I G. 4
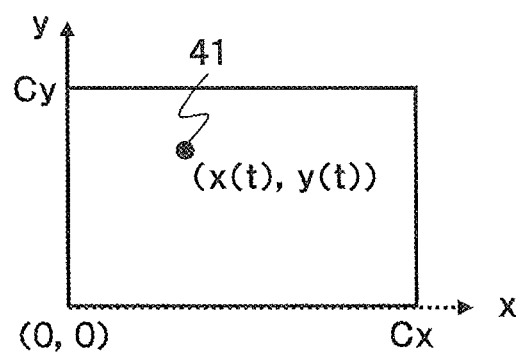

F I G. 6
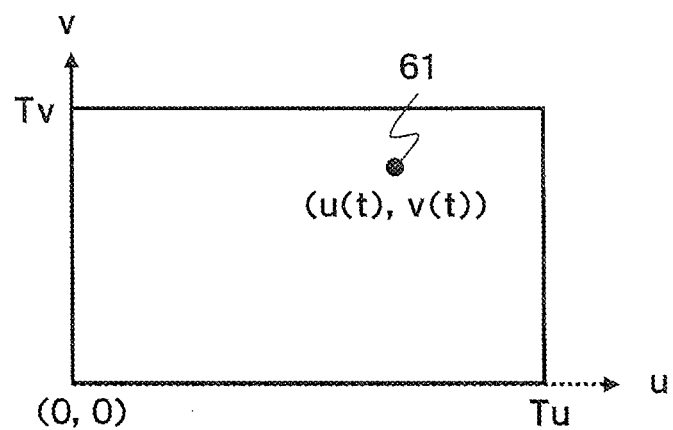

FIG. 7

| Sept. 1 (Fri) 14:00 – 15:00 | Blessings of Nature Specialists debate about global warming. What are the tips ... |

| | 061 | 081 | 101 |
|---|---|---|---|
| 14 | 00 Kansai News<br><br>Latest news and local weather forecast. Today's sports special. | 00 Blessings of Nature<br><br>What are the tips for energy saving measures and their economic effects!? | 00 Political and Economic News |
| 15 | | 00 Amusing Variety Show<br><br>Popular comedians and entertainers play quiz battles. Who will ···. | 00 Documentary |
| 16 | 00 Cooking Class | 00 Documentary Western Japan | 00 Detective Quiz |

FIG. 14

| Sept. 1 (Fri) 14:00 – 15:00 | Blessings of Nature<br>Specialists debate about global warming. What are the tips ⋯ |
|---|---|

| | 061 | 081 | 101 |
|---|---|---|---|
| 14 | 00 Kansai News<br>Latest news and local weather forecast.<br>Today's sports special. | 00 Blessings of Nature<br>Specialists debate about global warming. What are ⋯ | 00 Political and Economic News |
| 15 | | 00 Amusing Variety Show<br>Popular comedians and entertainers play quiz battles. Who will ⋯ | 00 Documentary |
| 16 | 00 Cooking Class | 00 Documentary Western Japan | 00 Detective Quiz |

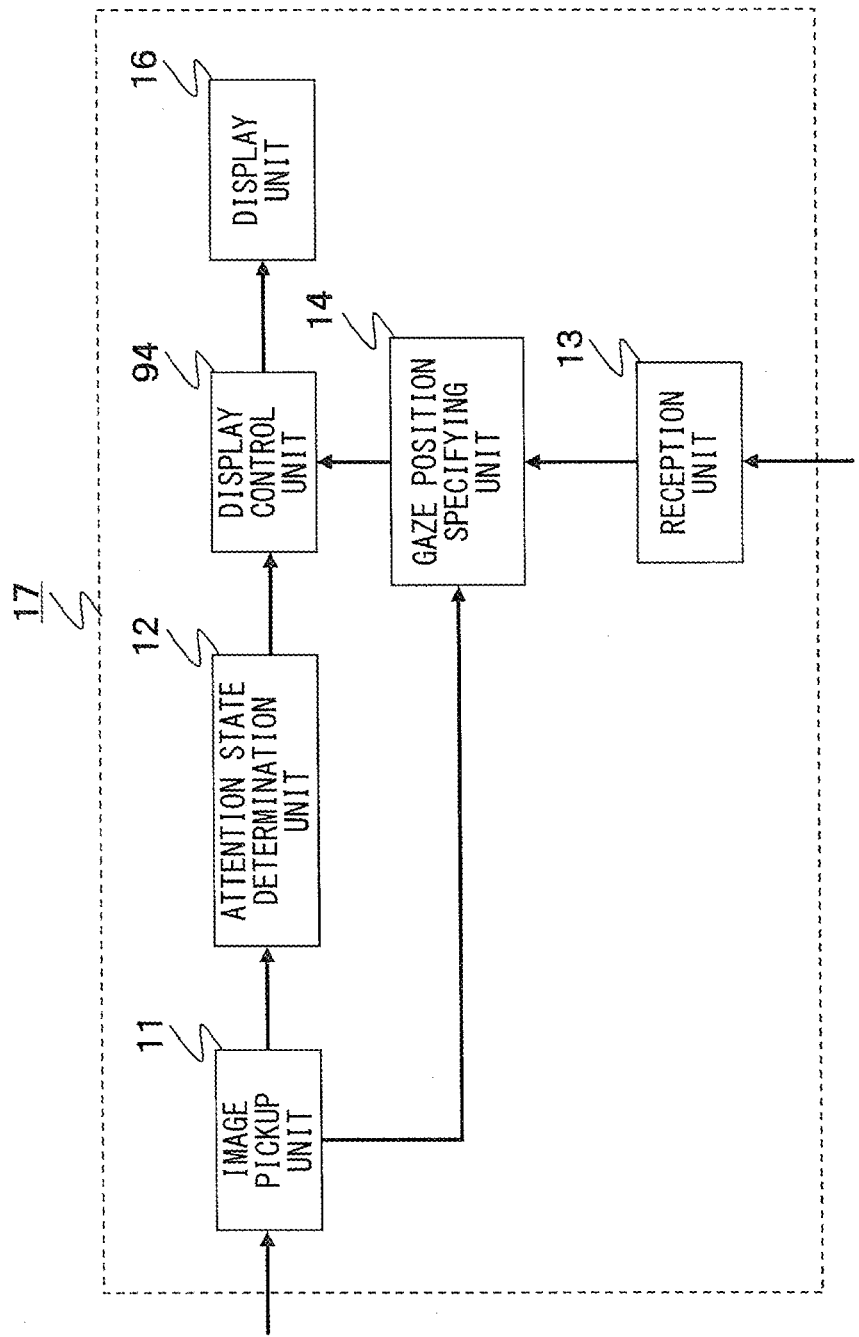

FIG. 18A

| What are the tips for energy saving measures and their Economic effects!? | News |
|---|---|
| 00 Amusing Variety Show<br><br>Popular comedians and entertainers play quiz battle. Who will be ··· | 00 Documentary<br><br>⌇— 205 |
| 00 Documentary Western Japan | 00 Detective Quiz |

FIG. 18B

| What are the tips for energy saving measures and their economic effects!? | News |
|---|---|
| 00 Amusing Variety Show<br><br>Popular comedians and entertainers play quiz battle. Who will be the king of fastest-finger-first quiz!? | 00 Documentary<br><br><br><br>00 Detective Quiz |

F I G. 1 9
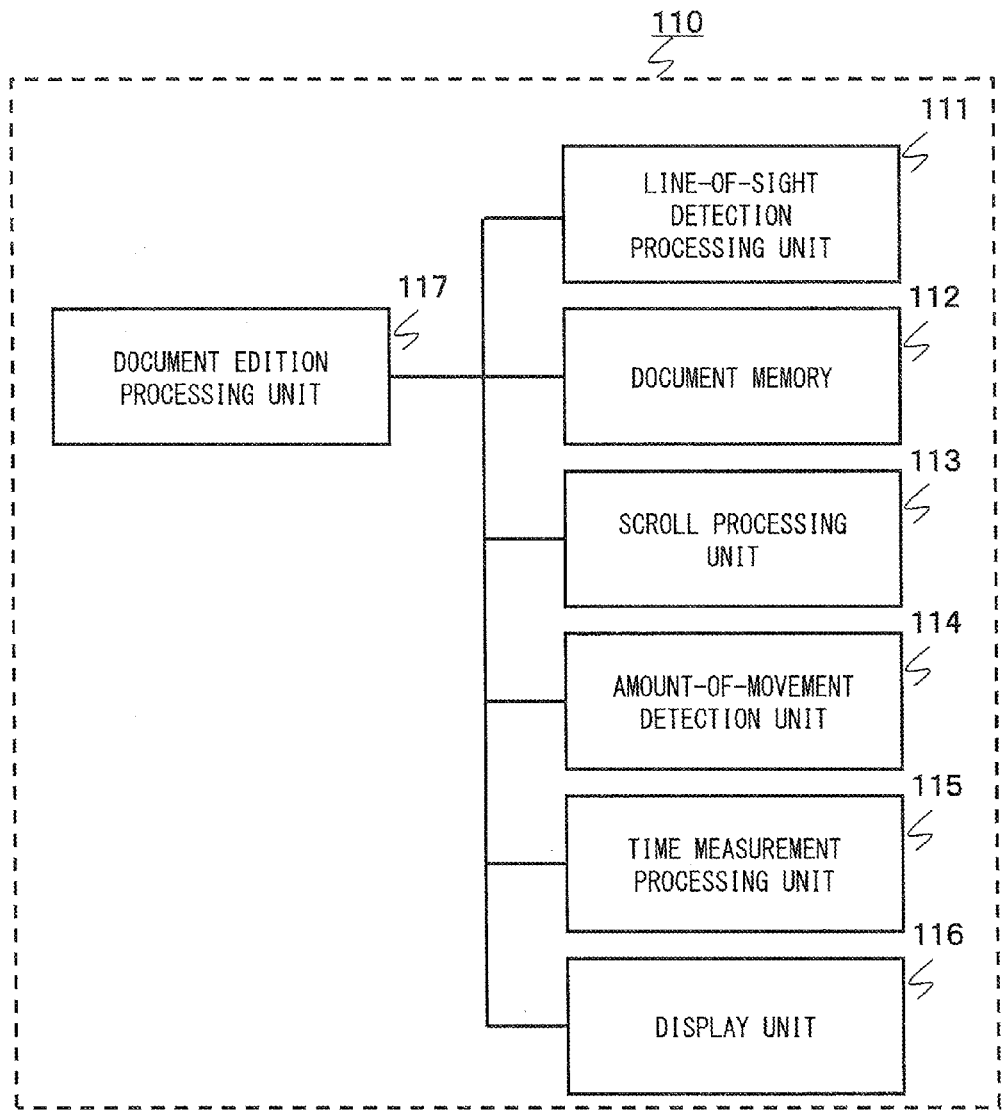

FIG. 20

PRIOR ART

[Geographical Conditions] In most parts of Japan, climate is warm, precipitation is high, and humidity in summer is high. Small rivers grow everywhere, and mountains are covered with forests. Such conditions are probably advantageous to agriculture not associated with large-scale flood control projects, particularly, labor-intensive agriculture with high land productivity. Actually, in Japan, paddy cultivation has been carried out from an early period, and villages of farmers who own farm lands have been developed. This situation resembles that of west Europe in many respects. The natural conditions and

FIG. 21

PRIOR ART

Such conditions are probably advantageous to agriculture not associated with large-scale flood control projects, particularly, labor-intensive agriculture with high land productivity. Actually, in Japan, paddy cultivation has been carried out from an early period, and villages of farmers who own farm lands have been developed. This situation resembles that of west Europe in many respects. The natural conditions and agricultural forms in Japan are different from those in Nile river valley, Ganga (Ganges) river valley, and Yellow River valley.
 In addition, bountiful forests, humidity, frequent earthquakes

DISPLAY CONTROL DEVICE AND METHOD DETECTING EYE POSITION OF A USER

TECHNICAL FIELD

The present invention relates to a display control device and a display control method, and more particularly, to a display control based on a gaze position and an attention state of a viewer.

BACKGROUND ART

A conventional scroll control device detects a line-of-sight position of a viewer on a display image, and performs a scroll process when the line-of-sight position of the viewer has reached an end of the display image (refer to Patent Literature 1, for example).

Hereinafter, the conventional scroll control device will be described with reference to drawings.

FIG. 19 is a block diagram showing the configuration of the conventional scroll control device described in Patent Literature 1.

In the conventional scroll control device 110, a display unit 116 for displaying a predetermined document is composed of a monitor such as a CRT (Cathode Ray Tube) or an LCD (Liquid Crystal Display). A document memory 112 stores therein document information to be displayed on the display unit 116. A movement amount detection unit 114 detects an amount of movement of a line of sight on a display image, and a time measurement processing unit 115 measures a time required for the line of sight to move on the display image. A scroll processing unit 113 for scrolling the display image has a function of scrolling the display image in accordance with scroll control information given from a document edition processing unit 117. In addition, a line-of-sight detection processing unit 111 detects a line of sight of a viewer, based on an image of the viewer taken by a camera.

The operation of the conventional scroll control device 110 configured as described above will be described with reference to FIGS. 19 to 21.

It is assumed that document information of a document to be read is stored in the document memory 112, and the specific content of the document is as shown in FIG. 20. When a viewer is reading this document on the screen, an image of the face of the viewer is input to the line-of-sight detection processing unit 111. The line-of-sight detection processing unit 111 detects the face of the viewer, and thereafter, detects the direction of the line of sight of the viewer. Then, the spatial position of the line of sight is detected based on the detected line-of-sight direction and the spatial coordinate positions of the eyes of the viewer, thereby detecting the position of the line of sight of the viewer on the display unit 116. In this line-of-sight detection, when the line of sight stops for a certain time, it is determined that the line of sight is detected. Therefore, even if the line of sight is directed to the display unit 116, it is not determined that the viewer looks at the display image, unless the line of sight stops for the predetermined time. After the line of sight has been detected, the amount of movement of the line of sight and the time required for the movement are measured as well as the position of the line of sight on the display image, and the movement velocity of the coordinate position of the line of sight on the display image is calculated. When the position of the line of sight has reached the most end of the display image as shown in FIG. 20, the display image is scrolled in accordance with the movement velocity of the line of sight at that time as shown in FIG. 21, thereby providing a scroll control device capable of performing appropriate scroll for the viewer.

CITATION LIST

Patent Literature

[PTL 1] Japanese Laid-Open Patent Publication No. 11-85452

SUMMARY OF THE INVENTION

Problems to be Solved by the Invention

In the conventional scroll control device described above, it is determined that the viewer is looking at the display image when the viewer's line of sight stops for a predetermined time on the display image, and the display image is scrolled when the position of the line of sight has reached the most end of the display image. However, this method has a problem that the display image might be scrolled also when the viewer does not consciously pay attention to the display image. For example, when the viewer unconsciously looks at the most end of the display image, the display image might be scrolled even though the viewer does not grasp the content of the display image.

The present invention is made to solve the above-mentioned problems, and it is an object of the present invention to provide a viewer with comfortable display control by determining the viewer's attention state to a display content and specifying the gaze position based on the viewer's eye position, and displaying a non-displayed portion of the display content when the viewer pays attention to the display content and to non-display information indicating that the display content has the non-displayed portion.

Solution to the Problems

A display control device according to the present invention includes: a display unit that displays, on a display screen, a display content, and non-display information indicating that the display content has a non-displayed portion; an image pickup unit that takes an image of a viewer, and detects an eye position of the viewer from the taken image of the viewer; an attention state determination unit that determines an attention state to the display content on the display screen, based on movement of the detected viewer's eye position; a gaze position specifying unit that specifies a gaze position on the display content, based on the detected viewer's eye position, and the display content on the display screen; and a display control unit that causes the display unit to display the non-displayed portion, in a case where the attention state determination unit has determined the attention state to the display content on the display screen, and the display control unit has determined that the non-display information is gazed, based on the gaze position specified by the gaze position specifying unit.

A display control method according to the present invention includes: a display step of displaying, on a display screen, a display content, and non-display information indicating that the display content has a non-displayed portion; an eye position detection step of taking an image of a viewer, and detecting an eye position of the viewer from the image of the viewer; an attention state determination step of determining an attention state to the display content on the display screen, based on movement of the detected viewer's eye position; a gaze position specifying step of specifying a gaze position on the display content, based on the detected viewer's eye position, and the display content on the display screen; and a display control step of displaying the non-displayed portion, in a case where the attention state to the display content on the display screen has been determined in the attention state determination step, and it has been determined that the non-display information is gazed, based on the gaze position specified in the gaze position specifying step.

Advantageous Effects of the Invention

According to the display control device and the display control method of the present invention, the viewer's attention state to the display content is determined and the gaze position is specified based on the viewer's eye position, and the non-displayed portion is displayed when the viewer pays attention to the display content and pays attention to the non-display information in the display content. Therefore, for example, when the viewer first looks at the non-display information accidentally, the non-displayed portion is not displayed, thereby providing the viewer with comfortable display control.

BRIEF DESCRIPTION OF THE DRAWINGS

FIG. 1 is a block diagram showing the configuration of a display control device according to Embodiment 1 of the present invention.

FIG. 2 is a diagram showing an example of program information displayed on a display unit of the display control device according to Embodiment 1 of the present invention.

FIG. 4 is a diagram showing central coordinates of pupil of a viewer, which is detected by a camera included in an image pickup unit of the display control device according to Embodiment 1 of the present invention.

FIG. 6 is a diagram showing coordinates of a gaze point on the display unit of the display control device according to Embodiment 1 of the present invention.

FIG. 7 is a diagram showing a state where a non-displayed portion of program summary of program information is displayed in the display control device according to Embodiment 1 of the present invention.

FIG. 14 is a diagram showing an example of display of program information.

FIG. 15 is a block diagram showing the configuration of a display control device according to Embodiment 4 of the present invention.

FIG. 18A is a diagram for explaining a method of displaying a display content that is not displayed.

FIG. 18B is a diagram for explaining a method of displaying a display content that is not displayed.

FIG. 19 is a block diagram showing the configuration of the conventional scroll control device.

FIG. 20 is a diagram showing a document content displayed on the display unit of the conventional scroll control device.

FIG. 21 is a diagram showing a scroll control operation of the conventional scroll control device.

DESCRIPTION OF EMBODIMENTS

Figure 3:
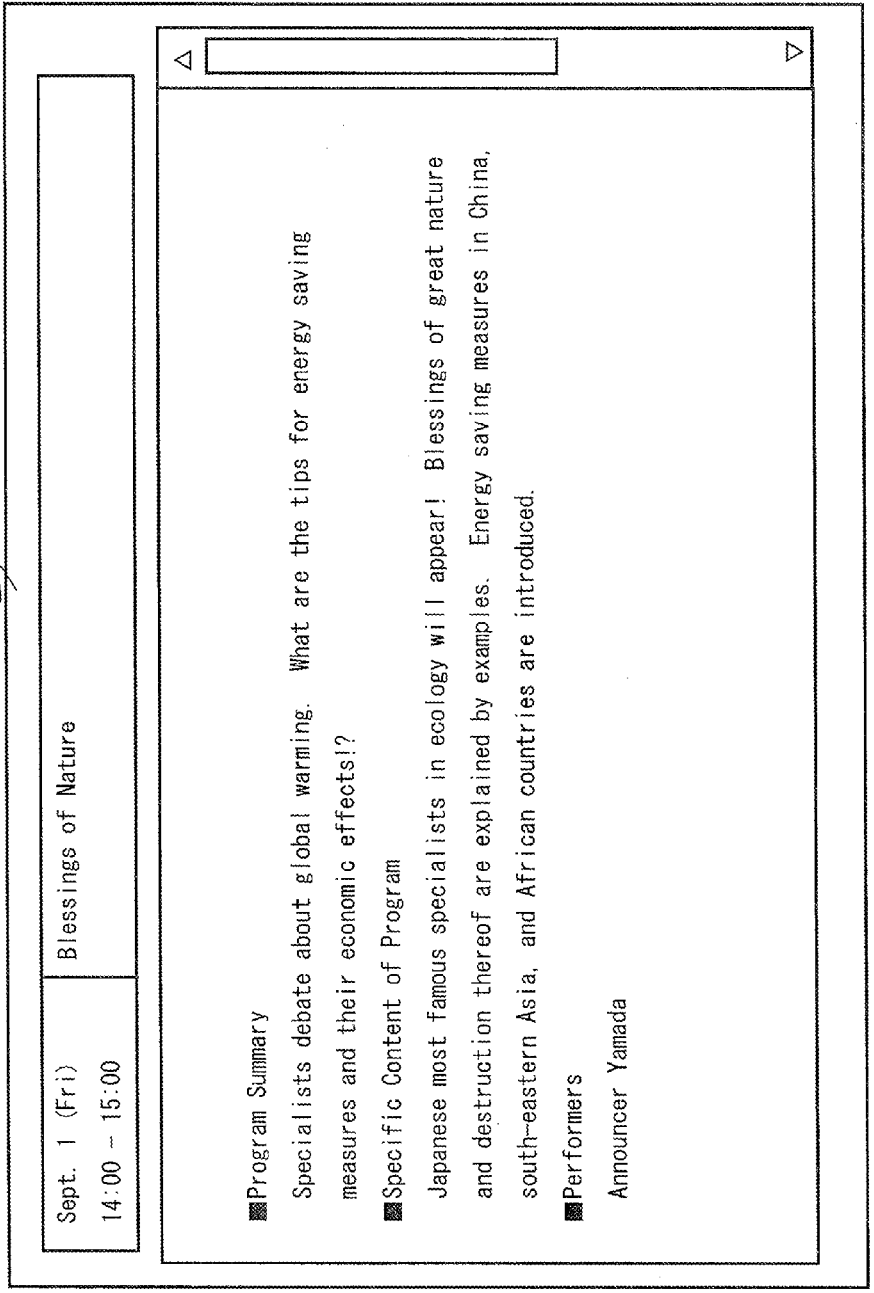
FIG. 3 is a diagram showing an example of specific program information displayed on the display unit of the display control device according to Embodiment 1 of the present invention.

Hereinafter, embodiments for carrying out the present invention will be described with reference to the drawings. The following will describe, as an example, a case where a display content displayed on a display screen is program information of an EPG (Electronic Program Guide).

(Embodiment 1)

FIG. 1 is a block diagram showing the configuration of a display control device 1 according to Embodiment 1 of the present invention.

The display control device 1 includes an image pickup unit 11, an attention state determination unit 12, a reception unit 13, a gaze position specifying unit 14, a display control unit 15, and a display unit 16.

The image pickup unit 11 includes a camera such as a CCD for taking an image of a viewer, and detects an eye position (central coordinates of pupil) of the viewer from the viewer's image taken by the camera. The central coordinates of the pupil of the viewer, which have been detected by the image pickup unit 11, are output to the attention state determination unit 12 and the gaze position specifying unit 14.

The attention state determination unit 12 determines, based on the central coordinates of the pupil of the viewer which have been inputted from the image pickup unit 11, whether the viewer is in a state where he/she pays attention to something (in the present embodiment, a state where the viewer pays attention to the program information; hereinafter sometimes referred to simply as "attention state"), and sends the attention state determination result to the display control unit 15. The attention state determination method will be described later in detail.

The reception unit 13 receives a broadcast signal, and extracts, from the broadcast signal, data of a video signal, an audio signal, SI (Service Information) and the like. Further, the reception unit 13 extracts, from the SI, the program information (e.g., the titles of broadcast programs, air dates, air start and end times, program summaries, specific program contents, program configuration information needed when the program information is displayed on the display unit 16, and the like). The reception unit 13 sends the extracted program information to the gaze position specifying unit 14.

The program information is multiplexed as the SI on a broadcast wave, and is a guide that allows a viewer to easily select a program the viewer wants to watch. The program information is provided to the viewer in a form like a program listing on a newspaper. The information provided to (or presented to) the viewer by the program information includes, for example, the titles of broadcast programs, air dates, air start and end times, program summaries, specific program contents, and the like.

FIG. 2 is a diagram showing an example of the program information displayed on the display unit 16 of the display control device 1 according to Embodiment 1 of the present invention.

The program information 20 includes a program listing display area 21 and a selected program information display area 22. A vertical axis 201 of the program listing display area 21 indicates the air start and end times of each program, and a horizontal axis 202 of the program listing display area 21 indicates the channel of each program. The titles and summaries of programs of channels 061, 081, and 101 to be broadcast from 14:00 pm to 17:00 pm are displayed. In the selected program information display area 22, the air date and time, title, and summary of a program selected by a cursor 203 in the program listing display area 21 are displayed. The program listing display area 21 includes a scroll bar 204. By the viewer's operating the scroll bar 204 using a remote control or the like, it is possible to display the titles and summaries of programs to be broadcast at the respective channels in a time zone different from the time zone currently displayed on the program listing display area 21.

Usually, the display control device 1 provides limitations on the number of characters, the number of rows, and the like to be displayed on the program listing display area 21 and the selected program information display area 22. Therefore, if a program has a large amount of information (a large number of characters), not all the information (characters) of the title and summary of the program can be displayed. If there is such information (characters) that cannot be displayed as the program information, for example, " . . . " (non-display information 205) is displayed at the end of the final text of the program summary that is displayed in the corresponding program frame, thereby clearly indicating the presence of the information (characters) that cannot be displayed. By operating the cursor 203 using a remote control or the like, the viewer selects and determines the corresponding program, and thus the viewer can browse the specific program information including the information (characters) that has not been displayed, the specific program content, performers, and the like. FIG. 3 is a diagram showing an example of the specific program information 30 displayed on the display unit 16 of the display control device 1 according to Embodiment 1 of the present invention.

The gaze position specifying unit 14 receives the central coordinates of the pupil of the viewer from the image pickup unit 11, and receives the program information from the reception unit 13. The gaze position specifying unit 14 calculates, from the received central coordinates of the pupil, the coordinates (gaze point) of a line-of-sight position of the viewer on the display unit 16. Based on the calculated gaze point and the program information received from the reception unit 13, the gaze position specifying unit 14 specifies the gaze position on the display content, and sends the gaze position specification result to the display control unit 15.

Based on the attention state determination result received from the attention state determination unit 12 and the gaze position specification result received from the gaze position specifying unit 14, the display control unit 15 performs a display control for a non-displayed portion of the program information displayed on the display unit 16.

The following will describe an attention state determination method, a gaze position specifying method, a display control method, and an overall flow of display control, which are performed in the display control device 1.

<Attention State Determination Method>

First of all, the attention state determination method of the display control device 1 will be described.

The image pickup unit 11 detects central coordinates ($x(t)$, $y(t)$) of pupil of a viewer at time t, from an image of the viewer inputted to a camera. The camera is provided in the image pickup unit 11 so as to take an image of the face of the viewer. The central coordinates ($x(t)$, $y(t)$) of the pupil are coordinates determined based on the position of the camera. When detecting the central coordinates of the pupil of the viewer, the image pickup unit 11 performs binarization of an eye image obtained from the face of the viewer, removal of eyelid from the eye image, and the like, thereby detecting the central coordinates of the pupil of the viewer at high accuracy.

FIG. 4 is a diagram showing the central coordinates 41 of the pupil of the viewer, which are detected by the camera included in the image pickup unit 11 of the display control device 1 according to Embodiment 1 of the present invention. Cx and Cy are the values of horizontal and vertical resolutions of the camera, respectively. In FIG. 4, a horizontal direction is represented by an x axis, a vertical direction is represented by a y axis, and an intersection of the x axis and the y axis is an origin. The central coordinates ($x(t)$, $y(t)$) of the pupil of the viewer which are detected by the image pickup unit 11 are output to the attention state determination unit 12 and the gaze position specifying unit 14.

Based on the central coordinates ($x(t)$, $y(t)$) of the pupil of the viewer inputted from the image pickup unit 11, the attention state determination unit 12 determines the attention state of the viewer, and sends the attention state determination result to the display control unit 15.

It has been known that when a human being pays attention to a stationary object, his/her eye frequently repeats a fixation for about 300 msec and a saccade that occurs for about 30 msec.

The attention state determination unit 12 determines whether the above-mentioned fixation and saccade occur continuously, based on the distance of movement of the central coordinates of the pupil of the viewer in the camera, which is inputted from the image pickup unit 11. When detecting the state where the above-mentioned fixation and saccade continuously occur a predetermined number of times or more, the attention state determination unit 12 determines this state as the attention state.

For example, when the distance of movement of the central coordinates of the pupil during 300 msec (0.3 sec) is equal to or shorter than a certain threshold i, and the distance of movement of the central coordinates of the pupil during the immediately subsequent 30 msec (0.03 sec) is equal to or longer than a certain threshold j, the attention state determination unit 12 determines that a fixation and a saccade have occurred. The distance $d(t)$ of movement of the central coordinates of the pupil per time t (frame) is calculated based on the following equation.

$$d(t)=\sqrt{(x(t)-x(t-1))^2+(y(t)-y(t-1))^2} \quad \text{(Equation 1)}$$

It is assumed that the frame rate of the image inputted from the camera of the image pickup unit 11 is f (frames/sec). The attention state determination unit 12 determines that a fixation has occurred when the total movement distance dsum1 of the distances d(t) during a period corresponding to f×0.3 frames satisfies the following (Equation 2).

$$d\text{ sum }1 \leq i \qquad \text{(Equation 2)}$$

Further, the attention state determination unit 12 determines that a saccade has occurred when the total movement distance dsum2 of the distances d(t) during a period corresponding to f×0.03 frames satisfies the following (Equation 3).

$$d\text{ sum }2 \geq j \qquad \text{(Equation 3)}$$

Then, the attention state determination unit 12 detects that a fixation and a saccade have occurred continuously, and when a combination of a fixation and a saccade has continuously occurred a predetermined number of times or more, the attention state determination unit 12 determines that the viewer pays attention to the program information, that is, the viewer is in the attention state, and sends the determination result to the display control unit 15.

Figure 5:
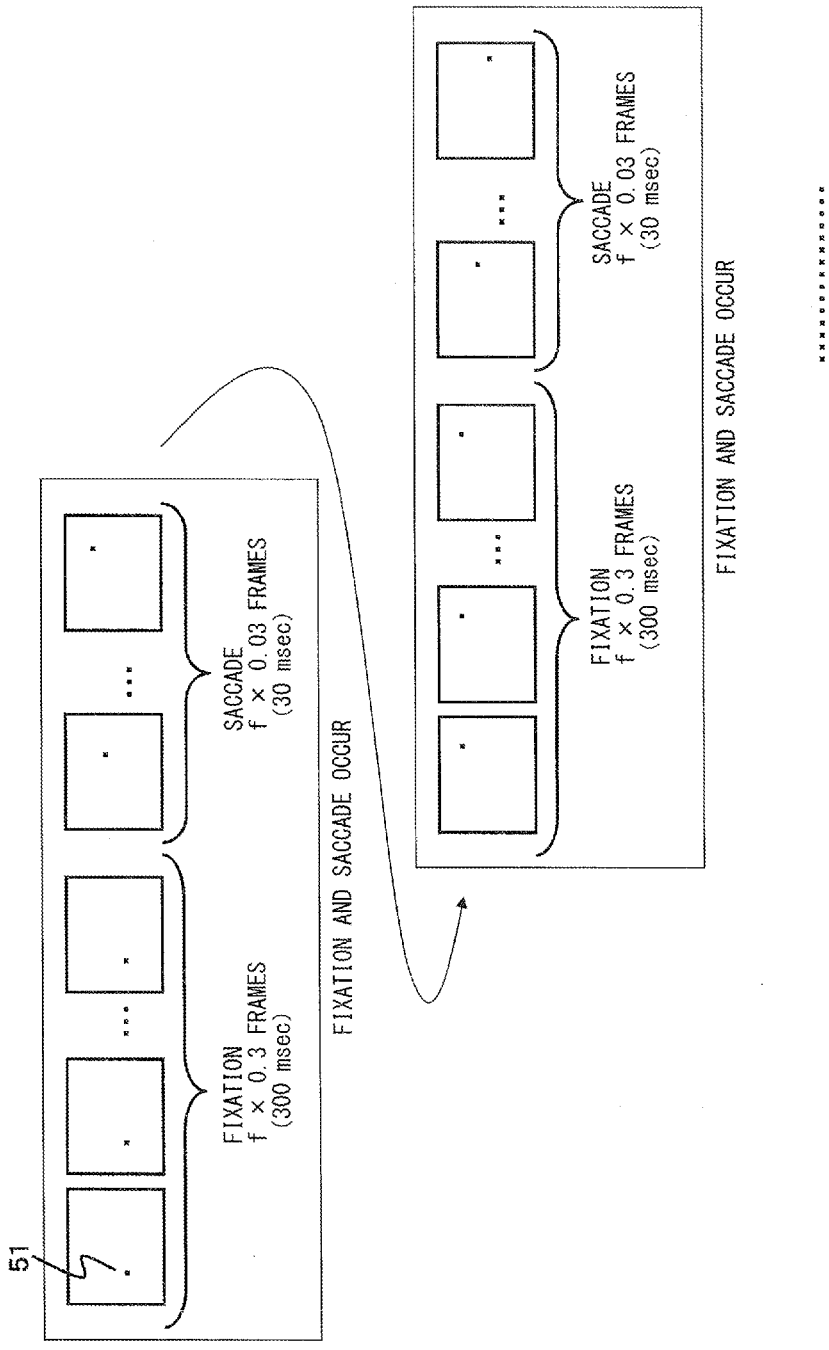
FIG. 5 is a diagram showing a manner in which an attention state determination unit of the display control device according to Embodiment 1 of the present invention determines an attention state of a viewer.

FIG. 5 is a diagram showing a manner in which the attention state determination unit 12 of the display control device 1 according to Embodiment 1 of the present invention determines the attention state of the viewer. The attention state determination unit 12 determines that a fixation has occurred when the total movement distance of the central coordinates 51 of the pupil of the viewer during the period corresponding to f×0.3 frames (300 msec) is equal to or shorter than the threshold i, determines that a saccade has occurred when the total movement distance of the central coordinates 51 of the pupil of the viewer during the immediately subsequent period corresponding to f×0.03 frames (30 msec) is equal to or longer than the threshold j, and determines that the viewer is in the attention state when a combination of a fixation and a saccade has continuously occurred a predetermined number of times or more.

The frame rate of the image inputted from the camera of the image pickup unit 11 varies depending on the resolution or performance of the camera, or the throughput of the display control device 1. Therefore, depending on the frame rate, the number of frames for determining a fixation or a saccade may have a decimal point. At this time, an appropriate number of frames should be set by performing rounding or the like. In this case, appropriate values of the thresholds i and j should be previously calculated taking into account the number of frames. Further, depending on the frame rate, two frames might exceed the time in which a saccade occurs, i.e., 30 msec. For example, when the frame rate is 10 frames/sec, 1 frame corresponds to 100 msec, which exceeds 30 msec. In this case, the distance d(t) of movement of the central coordinates of the pupil between the frame at which a fixation has been detected and the immediately subsequent frame is obtained, and when the distance d(t) is equal to or longer than j, it is determined that a saccade has occurred. When the viewer pays attention to the program information (when fixations and saccades occur continuously), since a fixation of 300 msec again occurs immediately after a fixation and a saccade, a saccade can be detected even if two frames exceed 30 msec. For example, when the frame rate is 10 frames/sec, a fixation is detected at the 1st, 2nd, and 3rd frames (300 msec). Then, when the distance d(t) of movement of the central coordinates of the pupil between the 3rd frame and the 4th frame is equal to or longer than j, it is determined that a saccade has occurred. However, if two frames exceed 300 msec, a fixation cannot be detected accurately. Therefore, if the frame rate is lower than 6 frames/sec (1 frame≈167 msec), the attention state cannot be detected.

<Gaze Position Specifying Method>

Next, the gaze position specifying method of the display control device 1 will be described.

As described above, the gaze position specifying unit 14 receives the central coordinates of the pupil of the viewer from the image pickup unit 11, and receives the program information from the reception unit 13. The program information outputted from the reception unit 13 to the gaze position specifying unit 14 includes program configuration information. The program configuration information is, for example, information indicating the positions where the characters constituting the program information and the non-display information indicating the presence of the non-displayed portion are arranged (displayed), or the positions where scroll bar and arrows are arranged (displayed), in the program listing display area 21 and the selected program information display area 22 of the display unit 16. The gaze position specifying unit 14 calculates, based on the received central coordinates of the pupil of the viewer, the coordinates (gaze point) of a line of sight of the viewer on the display unit 16. Specifically, the gaze position specifying unit 14 calculates the coordinates (u(t), v(t)) of the gaze point at time t based on the following equations:

$$u(t) = Tu/2 - (x(t) - Cx/2) \times A \qquad \text{(Equation 4)}$$

$$v(t) = Tv/2 - (y(t) - Cy/2) \times B \qquad \text{(Equation 5)}$$

where x(t), y(t) are the central coordinates of the pupil of the viewer at time t.

FIG. 6 is a diagram showing the coordinates 61 of the gaze point on the display unit 16 of the display control device 1 according to Embodiment 1 of the present invention. In FIG. 6, Tu and Tv represent the values of horizontal and vertical resolutions of the display unit 16, respectively. A horizontal direction is represented by a u axis, a vertical direction is represented by a v axis, and an intersection of the u axis and the v axis is an origin. In addition, the terms A and B used in (Equation 4) and (Equation 5), respectively, each indicate a ratio of the distance of movement of the gaze point on the display unit 16 to the distance of movement (in the horizontal, vertical direction) of the central coordinates of pupil of the viewer detected by the camera, and each ratio has previously been calculated by calibration (adjustment). Although (Equation 4) and (Equation 5) have been decided under the assumption that when the pupil of the viewer is located straight in front of the camera (in the center of the taken image), the gaze point of the viewer is located in the center of the display unit 16, these equations are merely examples, and other calculation methods may be adopted. The gaze point is a portion at which the viewer gazes on the display unit 16, and it doesn't matter whether the viewer pays attention to this portion.

Next, based on the calculated gaze point on the display unit 16 and the program configuration information received from the reception unit 13, the gaze position specifying unit 14 specifies the gaze position, that is, where on the program information the viewer gazes at. Specifying the gaze position means specifying where on the program information the gaze point on the display unit 16 is located, or specifying on which character the gaze point is located, or the like. For example, it is a concept also including specifying that the gaze point is located on the non-display information that is the final character in the final row in the program summary within a certain program frame of the program information. The gaze position specifying unit 14 sends the gaze position specification result to the display control unit 15.

<Display Control Method>

Based on the attention state determination result received from the attention state determination unit 12 and the gaze position specification result received from the gaze position specifying unit 14, the display control unit 15 performs a display control of the program information to display the information (characters) that is not displayed, when the viewer pays attention to the non-display information of the program information on the display unit 16. FIG. 7 is a diagram showing the state where the non-displayed portion of the program summary of the program information is displayed in the display control device 1 of the present invention. Specifically, in the program summary of "Blessings of Nature" to be broadcast from 14:00 pm at channel 081 as shown in FIG. 2, the display content that has been abbreviated by "..." as the non-display information 205 is displayed by display control. The display control may be, for example, one-row shift display or next-page display. The one-row shift display is a display method in which the entire text being displayed is shifted one row upward to display the text that has not been displayed. The next-page display is a display method in which the content being currently displayed is completely deleted, and the subsequent text is displayed. In the example shown in FIG. 7, the program title is displayed even after the display control, but the display control may be performed including the program title.

<Overall Flow of Display Control>

Finally, the overall flow of display control of the display control device 1 will be described with reference to FIGS. 1 and 8.

Figure 8:
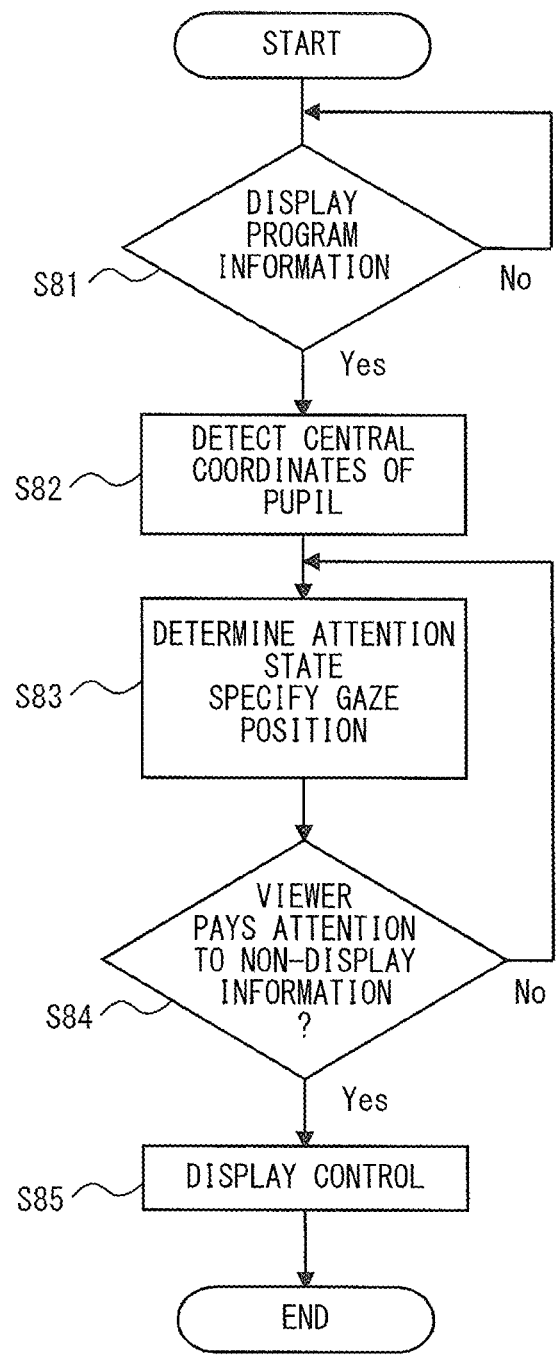
FIG. 8 is a flowchart showing a display control process of the display control device according to Embodiment 1 of the present invention.

FIG. 8 is a flowchart showing a display control process of the display control device 1 according to Embodiment 1 of the present invention.

When program information is displayed based on viewer's operation on a remote control or the like (Yes in step S81), the image pickup unit 11 detects the central coordinates of pupil of the viewer in the camera from an image of the viewer inputted to the camera (step S82).

The attention state determination unit 12 detects the attention state of the viewer from the central coordinates of the pupil of the viewer received from the image pickup unit 11. The attention state of the viewer is detected based on the characteristics of human eyes, that is, frequent repetition of a fixation for about 300 msec and a saccade that occurs for about 30 msec. The attention state determination unit 12 determines that a fixation and a saccade have occurred when the total movement distance of the central coordinates of the pupil during 300 msec is equal to or shorter than a certain threshold, and the total movement distance of the central coordinates of the pupil during the immediately subsequent 30 msec is equal to or longer than a certain threshold. The attention state determination unit 12 determines that the viewer is in the attention state when the fixation and the saccade have continuously occurred a predetermined number of times or more, and sends the determination result to the display control unit 15 (step S83).

Further, the gaze position specifying unit 14 calculates the gaze point of the viewer on the display unit 16 from the central coordinates of the pupil of the viewer received from the image pickup unit 11, and specifies the gaze position based on the calculated gaze point and the program information inputted from the reception unit 13. The gaze position specifying unit 14 sends the gaze position specification result to the display control unit 15 (step S83).

When the display control unit 15 has determined that the viewer pays attention to the non-display information of the program information on the display unit 16, based on the attention state determination result received from the attention state determination unit 12 and the gaze position specification result received from the gaze position specifying unit 14 (step S84), the display control unit 15 performs display control of the non-display information to display the information (characters) that is not displayed (step S85).

According to the display control device and the display control method of Embodiment 1 of the present invention, the viewer's attention state is determined and the viewer's gaze position is specified, based on the movement of the viewer's eye position and the program information. Then, based on the attention state determination result and the gaze position specification result, if the viewer pays attention to the non-display information of the program information, the non-displayed portion is displayed, thereby providing the viewer with comfortable display control.

(Embodiment 2)

The display control device 1 according to Embodiment 1 described above determines the viewer's attention state and specifies the viewer's gaze position, based on the movement of the viewer's eye position and the program information, and performs display control to display the non-displayed portion when the viewer pays attention to the non-display information of the program information, based on the attention state determination result and the gaze position specification result.

In the display control device 1 of Embodiment 1, however, even in a case where, for example, the viewer first looks at the non-display information accidentally, if this situation is determined as the attention state and the gaze position is specified, display control is performed, which causes inconvenience for the viewer who has not read the program information yet.

So, the display control device according to Embodiment 2 determines the viewer's attention state to text information included in the program information and specifies the viewer's gaze position, based on the movement of the viewer's eye position and the program information. Then, when the display control device determines, based on the determination result of the attention state to the text information of the program information and the gaze position specification result, that the viewer pays attention to the text information of the program information and pays attention to the non-display information of the program information, the non-displayed portion is displayed, thereby providing the viewer with more comfortable display control device and display control method.

Figure 9:
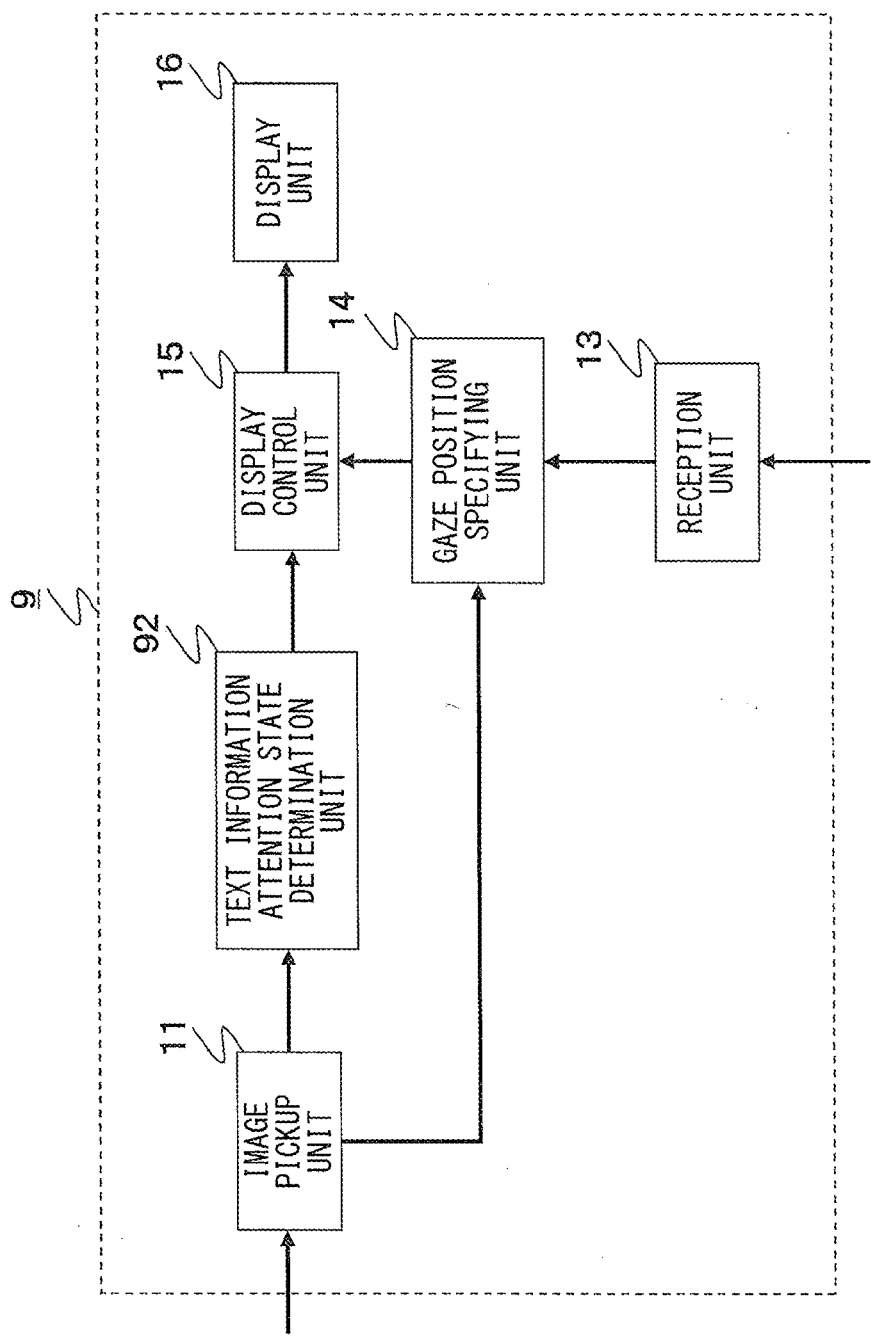
FIG. 9 is a block diagram showing the configuration of a display control device according to Embodiment 2 of the present invention.

FIG. 9 is a block diagram showing the configuration of the display control device 9 according to Embodiment 2 of the present invention. The display control device 9 includes an image pickup unit 11, a text information attention state determination unit 92, a reception unit 13, a gaze position specifying unit 14, a display control unit 15, and a display unit 16. In FIG. 9, the same components as those shown in FIG. 1 are denoted by the same reference characters, and the description thereof will be omitted.

<Method of Determining Attention State to Text Information>

The text information attention state determination unit 92 determines the viewer's attention state to the text information of the program information, based on the central coordinates (x(t), y(t)) of the pupil of the viewer inputted from the image pickup unit 11, and sends, to the display control unit 15, the determination result of the viewer's attention state to the text information of the program information.

When a human being (viewer) pays attention to horizontally-written text, usually, the viewer moves his/her eyes (line of sight) from left to right so as to follow the text while repeating a fixation for about 300 msec and a saccade that occurs for about 30 msec, and when the line of sight has reached the right end of the text, the viewer immediately shifts the line of sight to the next line, and then repeats the fixation and the saccade again from left to right so as to follow the text.

Based on the movement distance of the central coordinates of the pupil of the viewer inputted from the image pickup unit 11, when the central coordinates of the pupil of the viewer in the camera have made a predetermined movement while the attention state described in Embodiment 1 is continued, the text information attention state determination unit 92 determines this situation as the attention state to the text information.

For example, when the central coordinates of the pupil of the viewer have one or more great saccades in the x-axis direction (horizontal direction) and have no great saccade in the y-axis direction (vertical direction) while the attention state described in Embodiment 1 is continued, the text information attention state determination unit 92 determines this situation as the attention state to the horizontally-written text information. The attention state to the horizontally-written text information is detected based on the following equations:

$$\alpha \leq |x(t)-x(t-1)| \quad \text{(Equation 6)}$$

$$|y(t)-y(t-1)| \leq \beta \quad \text{(Equation 7)}$$

Specifically, while the attention state described in Embodiment 1 is continued, if (Equation 6) is satisfied one or more times and (Equation 7) is satisfied, the text information attention state determination unit 92 determines this situation as the state where the viewer pays attention to the horizontally-written text information, that is, as the attention state to the horizontally-written text information, and sends the determination result of the attention state to the horizontally-written text information to the display control unit 15. In the above equations, $\alpha$ is a threshold for discriminating a great saccade in the x-axis direction (a line feed when the viewer pays attention to the horizontally-written text), and $\beta$ is a threshold for determining that there is no great saccade in the y-axis direction. As for $\alpha$ and $\beta$, appropriate values thereof should be calculated in advance because the movement distance per frame varies depending on the frame rate of the image inputted from the camera of the image pickup unit 11. Further, when the distance of a saccade in the x-axis direction or the y-axis direction is measured according to the frame rate, the distance may be measured not only in one frame but also over two frames, three frames, or the like.

When the display control unit 15 determines that the viewer pays attention to the text information of the program information on the display unit 16 and pays attention to the non-display information of the program information, based on the determination result of the attention state to the horizontally-written text information, received from the text information attention state determination unit 92, and the gaze position specification result received from the gaze position specifying unit 14, the display control unit 15 performs display control of the program information to display the information (characters) that is not displayed.

<Overall Flow of Display Control>

The overall flow of the display control of the display control device 9 will be described with reference to FIGS. 9 and 10.

Figure 10:
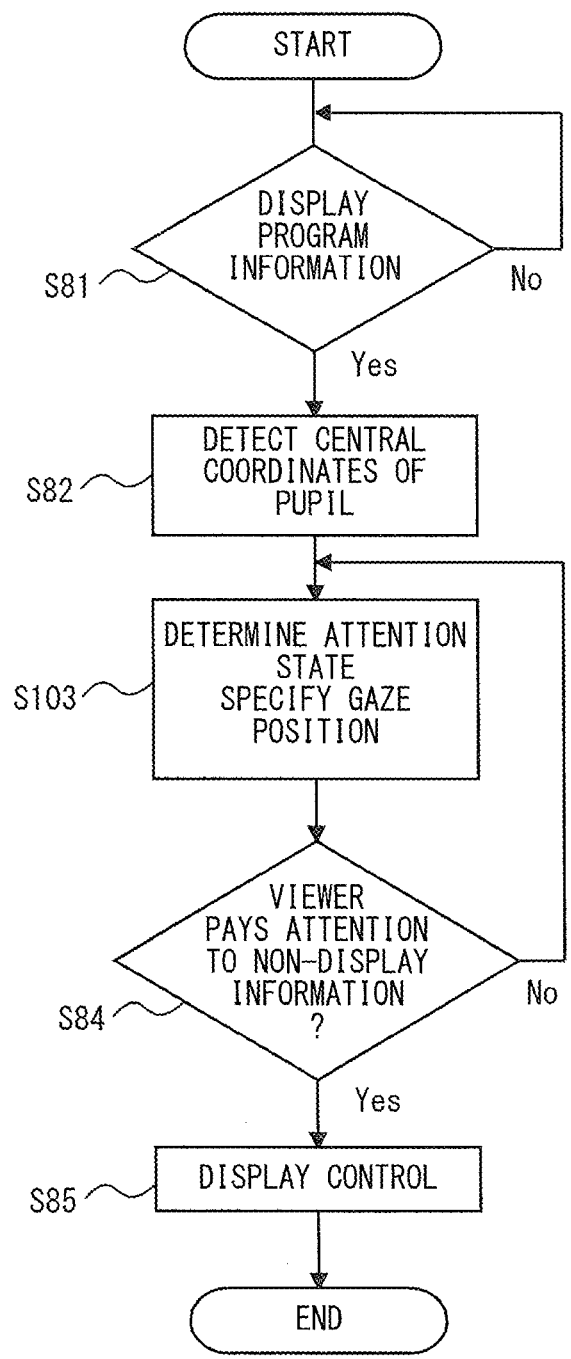
FIG. 10 is a flowchart showing a display control process of the display control device according to Embodiment 2 of the present invention.

FIG. 10 is a flowchart showing a display control process of the display control device 9 according to Embodiment 2 of the present invention. The flowchart shown in FIG. 10 is identical to the flowchart shown in FIG. 8 except that step S83 is replaced with step S103. In FIG. 10, the same steps as those shown in FIG. 8 are denoted by the same reference characters, and the description thereof will be omitted.

The text information attention state determination unit 92 determines the viewer's attention state to the horizontally-written program information, based on the central coordinates of the pupil of the viewer, received from the image pickup unit 11. Specifically, when the central coordinates of the pupil of the viewer in the camera have one or more great saccades in the x-axis direction (horizontal direction) and have no great saccade in the y-axis direction (vertical direction) while the viewer's attention state to the program information is continued, the text information attention state determination unit 92 determines this situation as the viewer's attention state to the horizontally-written text information, and sends the determination result to the display control unit 15 (step S103).

In the display control device according to Embodiment 2 of the present invention, when it is determined, based on the determination result of the attention state to the horizontally-written text information included in the program information and the gaze position specification result, that the viewer pays attention to the horizontally-written text information of the program information and pays attention to the non-display information of the program information, the non-displayed portion is displayed. By performing such control, even in a case where, for example, the viewer first looks at the non-display information accidentally, and further, the attention state is determined and the gaze position is specified, display of the non-displayed portion is suppressed. Therefore, according to Embodiment 2, the viewer's attention state to the program information can be determined with high accuracy, thereby providing the viewer with more comfortable display control device and display control method.

(Embodiment 3)

In the display control device 9 according to Embodiment 2, the detection accuracy of the viewer's attention state is enhanced by detecting that the central coordinates of the pupil of the viewer regularly move along the character strings constituting the program information while the attention state to the text information included in the program information is continued. However, in the display control device 9 of Embodiment 2, if the viewer diagonally reads the text information included in the program information, that is, if the amount of movement of the central coordinates of the pupil of the viewer in the horizontal direction is smaller than a predetermined threshold per unit time and therefore (Equation 6) is not satisfied, the detection accuracy of the attention state might be insufficient.

So, in the present embodiment, matching of each of the characters constituting the text information displayed on the display screen with the gaze point on the display screen which is obtained by calibration, is performed. Then, a matching ratio is obtained, which is a ratio of the number of characters that have matched the gaze point to the number of characters constituting the text information being displayed. By adding the result of determination as to whether the obtained matching ratio exceeds a predetermined threshold, the detection accuracy of the viewer's attention state to the text information can be enhanced.

Figure 11:
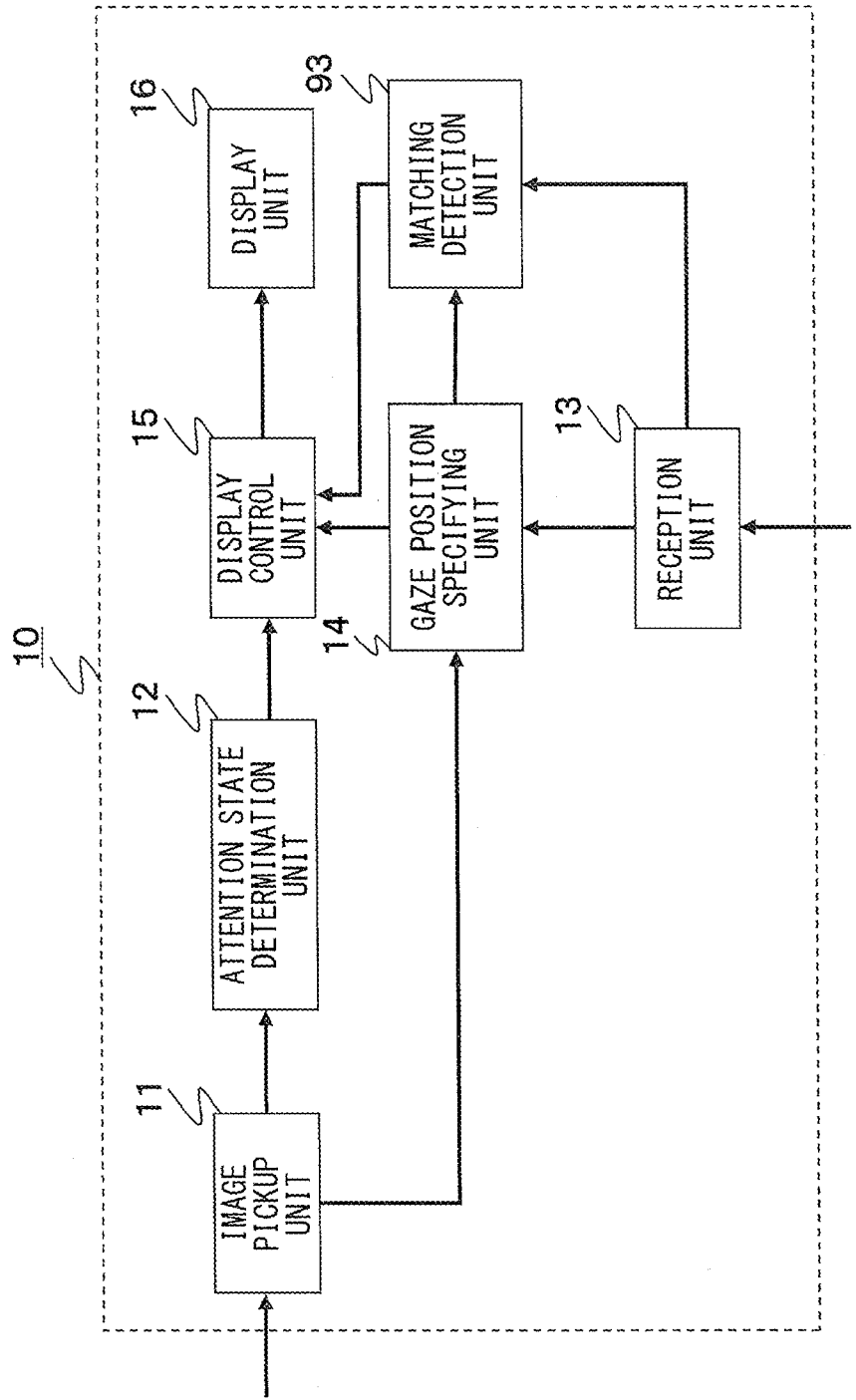
FIG. 11 is a block diagram showing the configuration of a display control device according to Embodiment 3 of the present invention.

FIG. 11 is a block diagram showing the configuration of a display control device 10 according to Embodiment 3 of the present invention. The display control device 10 includes an image pickup unit 11, an attention state determination unit 12, a reception unit 13, a gaze position specifying unit 14, a display control unit 15, a display unit 16, and a matching detection unit 93. In FIG. 11, the same components as those shown in FIG. 1 are denoted by the same reference characters, and the description thereof will be omitted.

The matching detection unit 93 receives the coordinates (u(t), v(t)) of the gaze point on the display screen, which are specified by the gaze position specifying unit 14, and receives the program information from the reception unit 13. The matching detection unit 93 specifies a display area of each of the characters constituting the program information, and determines whether the coordinates of the gaze point are within the display area of each character, thereby detecting matching of the viewer's gaze point with each character. The matching detection unit 93 calculates, as a matching ratio, a ratio of the number of characters that have matched the viewer's gaze point to the number of the characters included in the character strings constituting the program information, and sends the obtained matching ratio to the display control unit 15.

When the display control unit 15 has determined that the viewer pays attention to the program information on the display unit 16 and pays attention to the non-display information of the program information, and that the matching ratio exceeds the predetermined threshold, based on the attention state determination result received from the attention state determination unit 12, the gaze position specification result received from the gaze position specifying unit 14, and the matching ratio received from the matching detection unit 93, the display control unit 15 performs display control of the program information to display the information (characters) that is not displayed.

<Overall Flow of Display Control>

The overall flow of the display control of the display control device 10 will be described with reference to FIGS. 12 to 14.

Figure 12:
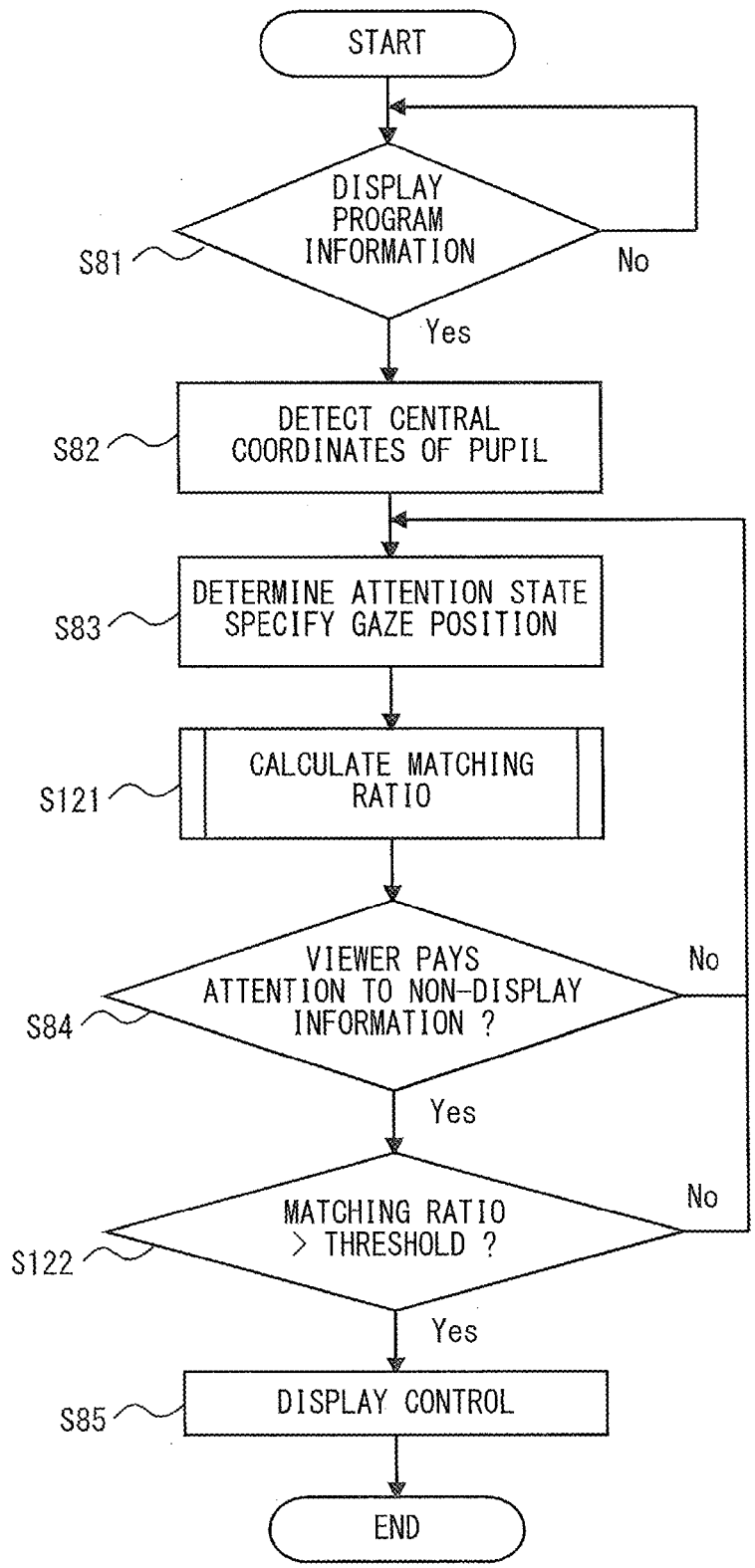
FIG. 12 is a flowchart showing a display control process of the display control device according to Embodiment 3 of the present invention.

FIG. 12 is a flowchart showing a display control process of the display control device 10 according to Embodiment 3 of the present invention. FIG. 13 is a flowchart showing, in detail, a matching rate calculation process shown in FIG. 12. FIG. 14 is a diagram showing an example of display of program information. The flowchart shown in FIG. 12 is identical to the flowchart shown in FIG. 8 except that steps S121 and S122 are added. The same steps as those shown in FIG. 8 are denoted by the same reference characters, and the description thereof will be omitted.

In step S121, the matching detection unit 93 detects a matching of the gaze position specified by the gaze position specifying unit 14 with each of the characters included in the program information received from the reception unit 13, and calculates a ratio of the number of characters that have matched the gaze point to the number of the characters included in the program information.

Figure 13:
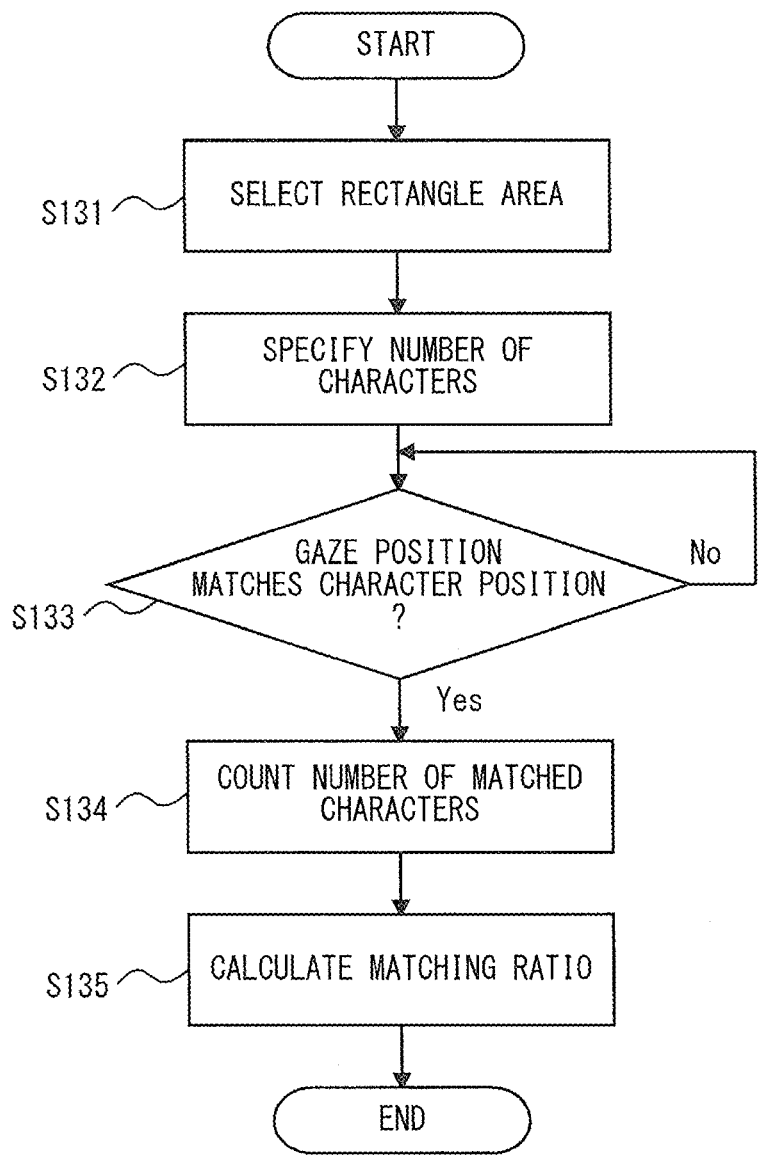
FIG. 13 is a flowchart showing, in detail, a matching ratio calculation process shown in FIG. 12.

More specifically, as shown in FIG. 13, the matching detection unit 93 firstly selects a rectangle area on the display screen, which encloses the coordinates (u(t), v(t)) of the gaze point specified by the gaze position specifying unit 14 (step S131). When the display content on the display screen is the program information, the box of the gazed program is selected as shown by a thick frame in FIG. 14. If the display content is other than the program information, a rectangle area that encloses the gaze point and includes a bunch of text information may be selected.

Next, the matching detection unit 93 specifies the number of characters included in the detected rectangle area, based on the program information received from the reception unit 13 (step S132). For example, in the example shown in FIG. 14, the number of characters is counted to be 73 characters from the text information "Amusing Variety Show Popular comedians and entertainers play quiz battles. Who will . . . "

Next, the matching detection unit 93 detects whether the coordinates (u(t), v(t)) of the gaze point specified by the gaze position specifying unit 14 overlap the display area of each character. When overlapping between the coordinates of the gaze point and the display area of each character has been detected (Yes in step S133), it is determined that the gaze point matches the character, and the control process proceeds to step S134. When overlapping between the coordinates of the gaze point and the display area of each character is not detected, the matching detection process is continued (No in step S133). The display area of each character may be an area of the character itself, or any rectangle area appropriately enclosing the character.

When overlapping between the coordinates of the gaze point and the display area of each character has been detected (Yes in step S133), the matching detection unit 93 counts up the number of characters that have matched the gaze point (step S134). If the coordinates of the gaze point overlap the display area of the same character by a plurality of times, it may be optionally determined whether count-up is made for each overlap, or only one time.

Next, the matching detection unit 93 divides the number of characters that have matched the gaze point (obtained in step S134) by the number of characters within the rectangle area (obtained in step S132), thereby calculating the matching ratio (step S135). The matching detection unit 93 sends the calculated matching ratio to the display control unit 15.

Referring back to FIG. 12, when the display control unit 15 has determined that the viewer pays attention to the text information of the program information on the display unit 16 and pays attention to the non-display information of the program information (Yes in step S84), the display control unit 15 further determines whether the matching ratio received from the matching detection unit 93 exceeds a predetermined threshold (step S122). When the matching ratio received from the matching detection unit 93 exceeds the predetermined threshold (Yes in step S122), the display control unit 15 performs display control of the program information to display the information (characters) that is not displayed (step S85). On the other hand, when the matching ratio received from the matching detection unit 93 is equal to or lower than the predetermined threshold (No in step S122), the control process returns to step S83.

By performing the above-mentioned display control, even when the viewer's gaze point does not move faithfully along the character strings, the non-displayed portion can be displayed when the matching ratio is equal to or higher than the threshold. In the example shown in FIG. 14, it is assumed that, as a result of word skipping in reading the program information enclosed in the thick frame, matches of the gaze point with the three words "variety", "popular comedians", and "fastest finger first" have been detected. In this case, if the matching ratio calculated from the sum of the number of characters constituting these words exceeds the predetermined threshold, it is regarded that a part of the character information corresponding to a certain percentage has been actually gazed and the content of the displayed program information has been read to some extent, and thus the non-displayed portion is displayed. Accordingly, in the present embodiment, it is possible to distinguish and recognize the case where the viewer skims through or diagonally reads the character information while gazing at the character information, from the case where the viewer merely moves the line-of-sight without gazing at the character information, thereby further enhancing the accuracy of display control based on the movement of the viewer's eye position.

Preferably, the display control according to the present embodiment is used in combination with the display control according to Embodiment 2. When the display controls of Embodiments 2 and 3 are combined, it is possible to recognize both the case where the viewer reads the character information faithfully along the character strings and the case where the viewer skims through or diagonally reads the character information while gazing at the character information, thereby realizing more accurate display control.

(Embodiment 4)

The above-mentioned embodiments have been described for the case where the non-displayed portion of the program information is subjected to display control. However, the present invention is not restricted thereto. The display control for the non-displayed portion according to the present invention may be applied to a scroll bar or the like. The following will describe a case where the display control of the present invention is applied to a scroll bar.

FIG. 15 is a block diagram showing the configuration of a display control device 17 according to Embodiment 4 of the present invention. The display control device 17 includes an image pickup unit 11, an attention state determination unit 12, a reception unit 13, a gaze position specifying unit 14, a display control unit 94, and a display unit 16. In FIG. 15, the same components as those shown in FIG. 1 are denoted by the same reference characters, and the description thereof will be omitted.

In the above-mentioned embodiments, as information indicating the presence of a display content that is not displayed on the display screen, the non-display information 205 shown in FIG. 2 (" . . . " in FIG. 2) is used. On the other hand, in the present embodiment, a scroll bar indicates the presence of a display content that is not displayed on the display screen. So, when the viewer pays attention to and gazes at the scroll bar, the display control unit 94 operates the scroll bar, based on the position of the gaze point, to display the display content that is not displayed.

Figure 16:
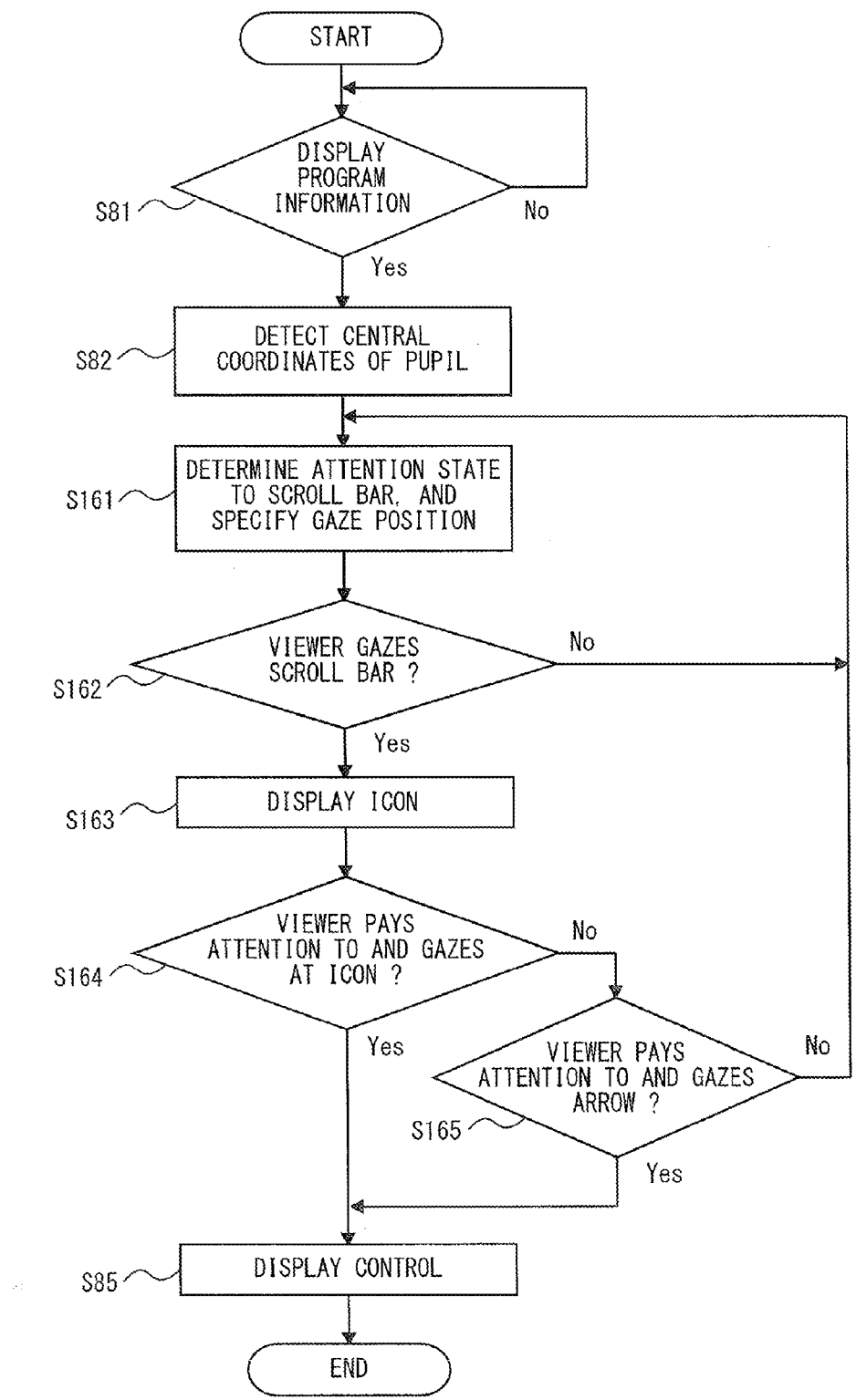
FIG. 16 is a flowchart showing a display control process of the display control device according to Embodiment 4 of the present invention.
Figure 17A:
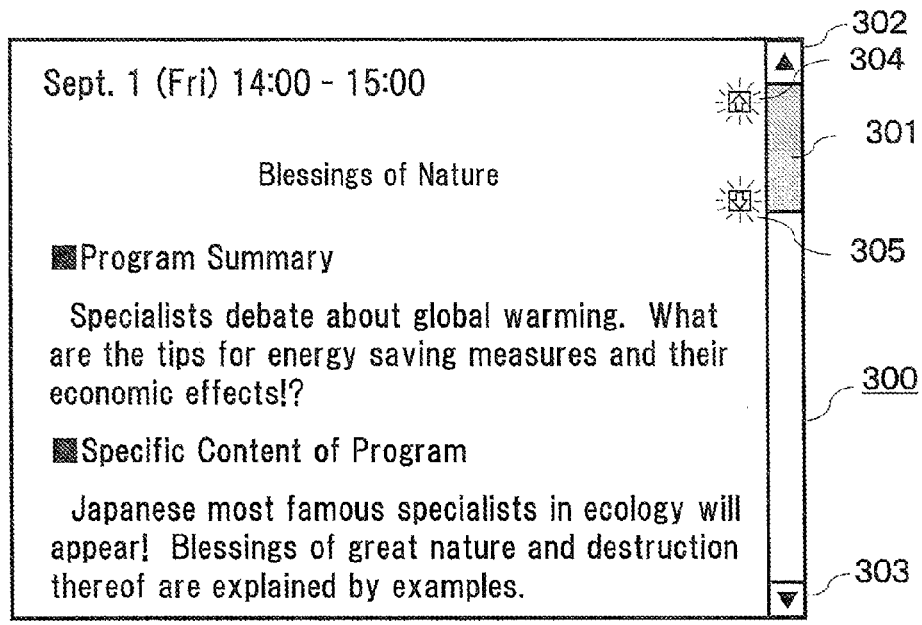
FIG. 17A is a diagram showing a manner in which a scroll bar is operated based on the position of a gaze point of a viewer.
Figure 17B:
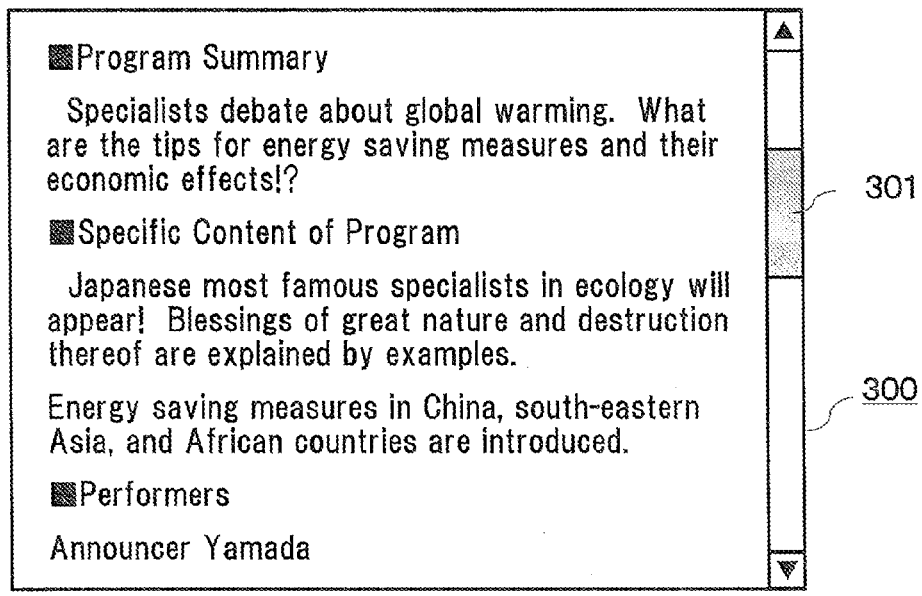
FIG. 17B is a diagram showing a manner in which a scroll bar is operated based on the position of a gaze point of a viewer.

FIG. 16 is a flowchart showing a display control process of the display control device according to Embodiment 4 of the present invention. FIGS. 17A and 17B are diagrams showing a manner of operating the scroll bar based on the position of the gaze point of the viewer. The flowchart shown in FIG. 16 is identical to the flowchart shown in FIG. 8 except that steps S161 to S165 are inserted in place of steps S83 and S84. The same steps as those shown in FIG. 8 are denoted by the same reference characters, and the description thereof will be omitted.

In step S161, the attention state determination unit 12 determines the attention state to the scroll bar, and the gaze position specifying unit 14 specifies the gaze point of the viewer. The display control unit 94 determines whether the viewer gazes at the scroll bar 300, based on the gaze position specified by the gaze position specifying unit 14 (step S162). When the viewer gazes at the scroll bar 300 (Yes in step S162), icons 304 and 305 indicating scroll directions are displayed (step S163, FIG. 17A), and otherwise (No in step S162), the control process returns to step S161. The icons 304 and 305 are displayed for the purpose of preventing a false operation such as unintended scroll control or the like due to accidental movement of the viewer's gaze position, or the like.

Next, the display control unit 94 determines whether the viewer pays attention to and gazes at the displayed icon 304 or 305, based on the determination result of the attention state determination unit 12 and the gaze position specified by the gaze position specifying unit 14 (step S164). When the viewer pays attention to and gazes at the icon 304 or 305 (Yes in step S164), the control process proceeds to step S85, and otherwise, (No in step S164), the control process proceeds to step S165.

When the viewer does not gaze at the icon 304 or 305 (No in step S164), the display control unit 94 determines whether the viewer pays attention to and gazes at an arrow 302 or 303 on the scroll bar 300, based on the determination result of the attention state determination unit 12 and the gaze position specified by the gaze position specifying unit 14 (step S165). When the viewer pays attention to and gazes at the arrow 302 or 303 (Yes in step S165), the control process proceeds to step S85, and otherwise (No in step S165), the control process returns to step S161.

When it is determined in step S164 that the viewer pays attention to and gazes at the icon 304 or 305 or when it is determined in step S165 that the viewer pays attention to and gazes at the arrow 302 or 303, the display control unit 94 scrolls the screen to display the display content that is not displayed (step S85, FIG. 17B). FIG. 17B shows the screen after the scroll in the case where the icon 305 is selected.

As described above, by utilizing the attention state determined based on a combination of a fixation and a saccade, and the viewer's gaze point, it is possible to operate the scroll bar 300 in accordance with the movement of the viewer's line of sight while reducing false operation due to accidental movement of the line of sight.

Preferably, the display positions of the icons 304 and 305 are near the viewer's gaze point. In this case, the amount of movement of the gaze point needed for the scroll operation, that is, the amount of movement of the line of sight, can be small, resulting in excellent operability. Alternatively, other display contents such as luminous small areas may be used instead of the icons 304 and 305.

While in the present embodiment, the scroll bar 300 is operated in the vertical direction by using the display control method of the present invention, the display control method of the present invention is similarly applicable to a scroll bar in the horizontal direction.

Further, in the present embodiment, after the viewer's attention and gaze at the scroll bar 300 has been detected, if the viewer's attention and gaze at the icon, the arrow, or the like is detected, display control is performed so as to operate the scroll bar 300. However, the scroll bar 300 may be operated based on the relative positional change of the gaze point. Specifically, after the viewer's attention and gaze at a knob 301 of the scroll bar 300 has been detected, if the viewer's attention and gaze at a position above or beneath the knob 301 is detected, the scroll may be controlled so as to slide the knob 301 from the firstly detected gaze position to the later detected gaze position. By controlling the scroll in this manner, the viewer can scroll the screen in a desired direction by a desired amount by moving the line of sight after paying attention to and gazing at the knob 301 of the scroll bar 300.

Further, in the present embodiment, display of the icons 304 and 305 may be omitted, and the scroll may be controlled based on the detection of the viewer's attention and gaze at the arrows 302 and 303.

Further, the display control method of the present embodiment is applicable not only to the method of operating the scroll bar 300 but also to operations of various GUI objects such as a slider, a spin button, a button, and the like. In addition, the present embodiment is also applicable to an operation of a GUI remote control or the like displayed on the screen, and an operation on a remote control with camera and display, a smartphone, a tablet, or the like.

(Other Modifications)

FIG. 18A and FIG. 18B are diagrams for explaining a method of displaying a display content that is not displayed.

In the state shown in FIG. 18A, the non-display information 205 (" . . . ") is displayed, which indicates the presence of a display content that is not displayed. While the attention state to the display content is detected, if the viewer gazes at the non-display information 205, the non-displayed content may be displayed as shown in FIG. 18B.

In the example of display shown in FIG. 7, at least a part of the display content that has already been displayed in FIG. 2 is deleted to display the display content that is not displayed. When the display method shown in FIG. 7 is adopted, since the non-displayed content is displayed within a predetermined display area, the entirety of the display content can be compactly displayed. On the other hand, in the example of display shown in FIG. 18B, the display area (thick frame) is extended downward to display the non-displayed content simultaneously with the already-displayed display content. When the display method shown in FIG. 18B is adopted, the entirety of the display content is displayed at one time, which makes it easy for the viewer to view the entirety of the display content.

While in FIG. 18B the display area is extended downward to display the entirety of the display content, another display area larger than the already-displayed displayed area may be popped up to display the entirety of the display content.

Further, while the display control devices 1, 9, 10, and 17 according to the above-mentioned embodiments each include the display unit 16, the display unit may be separated from the display control device.

Industrial Applicability

A display control device and a display control method according to the present invention can be utilized for controlling the display content of a television EPG, and the display contents of an IPTV (Internet Protocol TV), an SNS (Social Network Service), and the like, and are applicable to various electronic devices with camera, such as a television, a tablet computer, a smartphone, a mobile phone, a personal computer, and the like.

Description of the Reference Characters

1, 9, 10, 17 display control device
    11 image pickup unit
    12 attention state determination unit
    13 reception unit
    14 gaze position specifying unit
    15, 94 display control unit
    16 display unit
    20 program information
    21 program listing display area
    22 selected program information display area
    30 specific program information
    41, 51 central coordinates of pupil
    61 coordinates of a gaze point
    92 text information attention state determination unit
    93 matching detection unit
    110 scroll control device
    111 line-of-sight detection processing unit
    112 document memory
    113 scroll processing unit
    114 amount-of-movement detection unit
    115 time measurement processing unit
    116 display unit
    117 document edition processing unit
    201 vertical axis
    202 horizontal axis
    203 cursor
    204 scroll bar
    205 non-display information
    300 scroll bar
    301 knob
    302, 303 arrow
    304, 305 icon

The invention claimed is:

1. A display control device, comprising:
a display unit that displays, on a display screen, a display content, and non-display information indicating that the display content has a non-displayed portion;
an image pickup unit that takes an image of a viewer, and detects an eye position of the viewer from the taken image of the viewer;
an attention state determination unit that determines an attention state to the display content on the display screen, based on movement of the detected viewer's eye position;
a gaze position specifying unit that specifies a gaze position on the display content, based on the detected viewer's eye position, and the display content on the display screen; and
a display control unit that causes the display unit to display the non-displayed portion, in a case where the attention state determination unit has determined the attention state to the display content on the display screen, and the display control unit has determined that the non-display information is gazed, based on the gaze position specified by the gaze position specifying unit, wherein
the display content includes character strings,
the attention state determination unit further determines an attention state to the character strings on the display screen, based on movement of the detected viewer's eye position,
the display control unit causes the display unit to display the non-displayed portion, in a case where the attention state determination unit has determined both the attention state to the display content on the display screen and the attention state to the character strings on the display screen, and the display control unit has determined that the non-display information is gazed, based on the gaze position specified by the gaze position specifying unit, and
when the character strings of the display content are written in the horizontal direction,
the attention state determination unit determines the attention state to the character strings on the display screen, in a case where the attention state to the display content is continued, and the amount of movement of the detected viewer's eye position in the horizontal direction within a predetermined time period is equal to or larger than a first threshold, and the amount of movement of the detected viewer's eye position in the vertical direction within the predetermined time period is equal to or smaller than a second threshold.

2. The display control device according to claim 1, wherein
the non-display information indicating that the display content has a non-displayed portion is a graphical user interface (GUI) object that scrolls the display content, and
the display control unit operates the GUI object based on movement of the gaze position specified by the gaze position specifying unit, and causes the display unit to display the non-displayed portion, in a case where the attention state determination unit has determined an attention state to the GUI object, and the display control unit has determined that the GUI. object is gazed, based on the gaze position specified by the gaze position specifying unit.

3. The display control device according to claim 1, wherein the display control unit displays the non-displayed portion together with the display content that has already been displayed on the display screen.

4. The display control device according to claim 1, further comprising:
a reception unit that receives program information as the display content.

5. A display control device, comprising:
a display unit that displays, on a display screen, a display content, and non-display information indicating that the display content has a non-displayed portion;
an image pickup unit that takes an image of a viewer, and detects an eye position of the viewer from the taken image of the viewer;
an attention state determination unit that determines an attention state to the display content on the display screen, based on movement of the detected viewer's eye position;
a gaze position specifying unit that specifies a gaze position on the display content, based on the detected viewer's eye position, and the display content on the display screen; and
a display control unit that causes the display unit to display the non-displayed portion, in a case where the attention state determination unit has determined the attention state to the display content on the display screen, and the display control unit has determined that the non-display information is gazed, based on the gaze position specified by the gaze position specifying unit, wherein
the display content includes character strings,
the display control device further includes a matching detection unit that detects matching between the gaze position specified by the gaze position specifying unit and the position of each character included in the character strings, and calculates a matching ratio which is a ratio of the number of characters matched with the gaze position to the number of characters included in the character strings, and
in a case where the attention state determination unit has determined the attention state to the display content on the display screen, and the display control unit has determined that the non-display information is gazed, based on the gaze position specified by the gaze position specifying unit, the display control unit causes the display unit to display the non-displayed portion when the display control unit has further determined that the matching ratio calculated by the matching detection unit exceeds a threshold.

6. The display control device according to claim 5, wherein
the non-display information indicating that the display content has a non-displayed portion is a graphical user interface (GUI) object that scrolls the display content, and
the display control unit operates the GUI object based on movement of the gaze position specified by the gaze position specifying unit, and causes the display unit to display the non-displayed portion, in a case where the attention state determination unit has determined an attention state to the GUI object, and the display control unit has determined that the GUI object is gazed, based on the gaze position specified by the gaze position specifying unit.

7. The display control device according to claim 5, wherein the display control unit displays the non-displayed portion together with the display content that has already been displayed on the display screen.

8. The display control device according to claim 5, further comprising:
a reception unit that receives program information as the display content.

9. A display control method, comprising:
a display step of displaying, on a display screen, a display content, and non-display information indicating that the display content has a non-displayed portion;
an eye position detection step of taking an image of a viewer, and detecting an eye position of the viewer from the image of the viewer;
an attention state determination step of determining an attention state to the display content on the display screen, based on movement of the detected viewer's eye position;
a gaze position specifying step of specifying a gaze position on the display content, based on the detected viewer's eye position, and the display content on the display screen; and
a display control step of displaying the non-displayed portion, in a case where the attention state to the display content on the display screen has been determined in the attention state determination step, and it has been determined that the non-display information is gazed, based on the gaze position specified in the gaze position specifying step, wherein
the display content includes character strings,
in the attention state determination step, an attention state to the character strings on the display screen is further determined based on movement of the detected viewer's eye position,
in the display control step, the non-displayed portion is displayed, in a case where both the attention state to the display content on the display screen and the attention state to the character strings on the display screen have been determined in the attention state determination step, and it has been determined that the non-display information is gazed, based on the gaze position specified in the gaze position specifying step, and
when the character strings of the display content are written in the horizontal direction,
in the attention state determination step, the attention state to the character strings on the display screen is determined, in a case where the attention state to the display content is continued, and the amount of movement of the detected viewer's eye position in the horizontal direction within a predetermined time period is equal to or larger than a first threshold, and the amount of movement of the detected viewer's eye position in the vertical direction within the predetermined time period is equal to or smaller than a second threshold.

10. A display control method, comprising:
a display step of displaying, on a display screen, a display content, and non-display information indicating that the display content has a non-displayed portion;
an eye position detection step of taking an image of a viewer, and detecting an eye position of the viewer from the image of the viewer;
an attention state determination step of determining an attention state to the display content on the display screen, based on movement of the detected viewer's eye position;
a gaze position specifying step of specifying a gaze position on the display content, based on the detected viewer's eye position, and the display content on the display screen; and a display control step of displaying the non-displayed portion, in a case where the attention state to the display content on the display screen has been determined in the attention state determination step, and it has been determined that the non-display information is gazed, based on the gaze position specified in the gaze position specifying step, wherein the display content includes character strings, the display control method further includes a matching detection step of detecting matching between the gaze position specified in the gaze position specifying step and the display position of each character included in the character strings, and calculating a matching ratio which is a ratio of the number of characters matched with the gaze position to the number of characters included in the character strings, and in the display control step, in a case where the attention state to the display content on the display screen has been determined in the attention state determination step, and it has been determined, based on the gaze position specified in the gaze position specifying step, that the non-display information is gazed, if it has been further determined that the matching ratio calculated in the matching detection step exceeds a threshold, the non-displayed portion is displayed.

* * * * *